(12) United States Patent
Ong et al.

(10) Patent No.: US 8,160,994 B2
(45) Date of Patent: Apr. 17, 2012

(54) SYSTEM FOR SIMULATING EVENTS IN A REAL ENVIRONMENT

(75) Inventors: Thian Liang Ong, Duivendrecht (NL); Manuel Rejen, Zwijndrecht (NL)

(73) Assignee: Iopener Media GmbH, Aachen (DE)

( * ) Notice: Subject to any disclaimer, the term of this patent is extended or adjusted under 35 U.S.C. 154(b) by 909 days.

(21) Appl. No.: 12/106,263

(22) Filed: Apr. 18, 2008

(65) Prior Publication Data

US 2009/0076784 A1    Mar. 19, 2009

Related U.S. Application Data

(63) Continuation-in-part of application No. 10/031,575, filed as application No. PCT/NL00/00513 on Jul. 21, 2000, now abandoned.

(30) Foreign Application Priority Data

Jul. 21, 1999    (NL) ..................................... 1012666

(51) Int. Cl.
  *G06F 15/00*    (2006.01)
  *G06F 15/18*    (2006.01)
(52) U.S. Cl. ................ 706/62; 706/15; 706/45; 706/46; 706/47; 703/6; 703/13
(58) Field of Classification Search .......................... None
See application file for complete search history.

(56) References Cited

U.S. PATENT DOCUMENTS

| 5,153,836 A | 10/1992 | Fraughton et al. |
| 5,462,275 A | 10/1995 | Lowe et al. |
| 5,507,485 A | 4/1996 | Fisher |
| 5,526,479 A | 6/1996 | Barstow et al. |
| 5,564,698 A | 10/1996 | Honey et al. |

(Continued)

FOREIGN PATENT DOCUMENTS

GB    2 365 360    8/2004

(Continued)

OTHER PUBLICATIONS

International Search Report issued in PCT/IB2009/005144 on Aug. 3, 2009.

(Continued)

*Primary Examiner* — Omar Fernandez Rivas
(74) *Attorney, Agent, or Firm* — Foley & Lardner LLP; Matthew L. Fenselau

(57) ABSTRACT

System for simulating events in a real environment containing static objects and dynamic objects: a) position locating unit for continuously determining the real environment the position of the dynamic objects in relation to the static objects within a time period in which the even takes place; b) storage elements for storing data describing the dynamic and static objects of the environment; c) processing elements for processing (b1) data from the storage elements describing the static and dynamic objects (b2) data from the position locating unit indicating at a certain moment the mutual positions of the static and dynamic objects of the environment, the processing elements being loaded with simulation software; d) display elements for displaying a simulated view from a selected viewpoint on the simulated environment as a result of the processing by the processing elements; e) control elements to repeat the functioning of the processing and display elements for a range of consecutive time moments which together determine the above-mentioned time period wherein the position locating unit includes a satellite navigation system, or a thereto-related system.

21 Claims, 1 Drawing Sheet

U.S. PATENT DOCUMENTS

| | | | |
|---|---|---|---|
| 5,623,414 A | | 4/1997 | Misra |
| 5,674,127 A | | 10/1997 | Horstmann et al. |
| 5,742,521 A | | 4/1998 | Ellenby et al. |
| 5,745,126 A | | 4/1998 | Jain et al. |
| 5,751,612 A | | 5/1998 | Donovan et al. |
| 5,914,685 A | | 6/1999 | Kozlov et al. |
| 5,983,161 A | * | 11/1999 | Lemelson et al. ............ 701/301 |
| 6,006,021 A | | 12/1999 | Tognazzini |
| 6,020,851 A | | 2/2000 | Busack |
| 6,031,545 A | | 2/2000 | Ellenby et al. |
| 6,080,063 A | | 6/2000 | Khosla |
| 6,113,504 A | | 9/2000 | Kuesters |
| 6,126,548 A | | 10/2000 | Jacobs et al. |
| 6,152,856 A | * | 11/2000 | Studor et al. ...................... 482/8 |
| 6,166,744 A | * | 12/2000 | Jaszlics et al. ................ 345/629 |
| 6,179,619 B1 | * | 1/2001 | Tanaka ............................ 434/69 |
| 6,195,090 B1 | | 2/2001 | Riggins |
| 6,226,622 B1 | * | 5/2001 | Dabbiere ........................ 705/28 |
| 6,246,468 B1 | | 6/2001 | Dimsdale |
| 6,254,394 B1 | * | 7/2001 | Draper et al. .................... 434/11 |
| 6,324,474 B1 | | 11/2001 | Beisner et al. |
| 6,370,475 B1 | * | 4/2002 | Breed et al. .................... 701/301 |
| 6,401,033 B1 | | 6/2002 | Paulauskas et al. |
| 6,483,511 B1 | * | 11/2002 | Snyder .......................... 345/473 |
| 6,496,189 B1 | * | 12/2002 | Yaron et al. .................... 345/428 |
| 6,498,955 B1 | * | 12/2002 | McCarthy et al. ................ 700/1 |
| 6,616,529 B1 | | 9/2003 | Qian et al. |
| 6,785,667 B2 | | 8/2004 | Orbanes et al. |
| 6,940,538 B2 | | 9/2005 | Rafey et al. |
| 2002/0049507 A1 | | 4/2002 | Hameen-Anttila |
| 2002/0080279 A1 | | 6/2002 | Wang et al. |
| 2002/0091017 A1 | | 7/2002 | Kuesters |
| 2002/0098913 A1 | | 7/2002 | Goldman |
| 2002/0132211 A1 | | 9/2002 | August et al. |
| 2003/0014275 A1 | | 1/2003 | Bearden et al. |
| 2003/0038805 A1 | | 2/2003 | Wong et al. |
| 2003/0038892 A1 | | 2/2003 | Wang et al. |

FOREIGN PATENT DOCUMENTS

| | | |
|---|---|---|
| JP | 09114370 | 5/1997 |
| WO | WO 9846029 | 10/1998 |
| WO | WO 01/05476 | 1/2001 |

OTHER PUBLICATIONS

International Preliminary Report on Patentability for PCT/IB2009/005144 mailed Oct. 19, 2010.

K O'Connel et al. "The VOID Shell, a Toolkit for the Development of Distributed Video Games and Virtual Worlds" Proceedings of 1st Workshop on Simulation and Interaction in Virtual Environments, 1995, XP002089776 p. 176-177, paragraph 3.4.

Examination Report for EP 09 732 536.9 dated May 4, 2011 (6 pages).

* cited by examiner

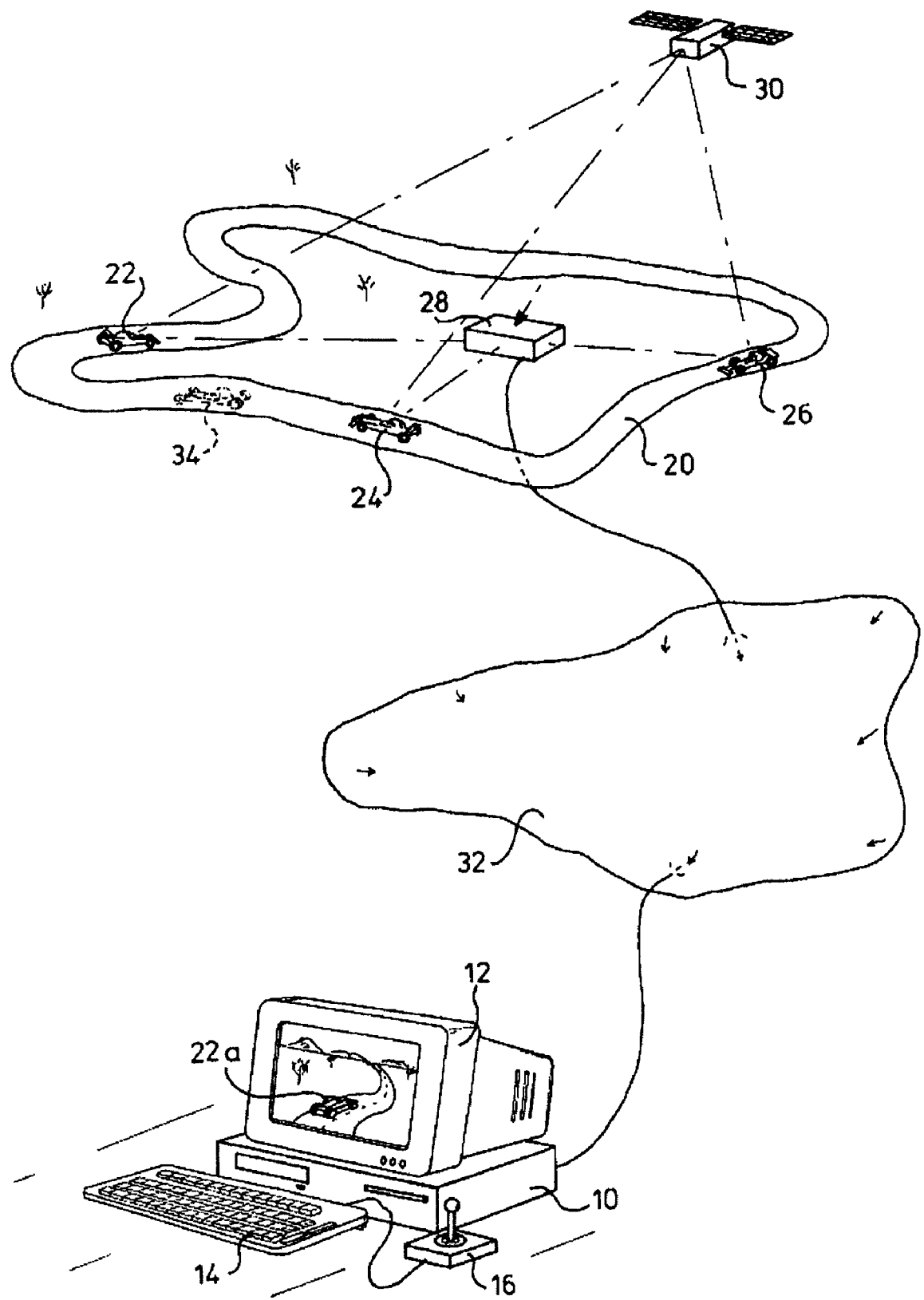

SYSTEM FOR SIMULATING EVENTS IN A REAL ENVIRONMENT

CROSS-REFERENCE TO RELATED PATENT APPLICATIONS

The present application is a continuation-in-part of, and claims priority to U.S. application Ser. No. 10/031,575 filed May 13, 2002 now abandoned, which is a continuation of International Application No. PCT/NL00/00513, which designated the United States, and was filed on 21 Jul. 2000, published in English, and which claims the benefit of the Netherlands priority Application No. 1012666, filed on Jul. 21, 1999. Each of the above applications are entirely incorporated herein by reference.

FIELD OF THE INVENTION

The present invention relates generally to the field of computer games. More particularly, the present invention relates to systems for simulating events in a real environment containing static objects and dynamic objects.

BACKGROUND OF THE INVENTION

Systems of this type are already known from the prior art. An example is described in EP0773514. This prior art system is specifically destined to simulate games, sporting events, etc. which take place on a relatively restricted area. Each of the players or competitors in the game carry a transponder and also other moving objects, such as a ball in a ball game have a transponder installed therein or thereon. In the direct vicinity of the area where the game is played a number of receivers is installed which do receive the signals from the various transponders. Each transponder transmits an identity code so that the respective transponder can be recognized. Because the transmitted signals are received by a number of receivers it is possible to determine the exact position of the respective transponder based on phase measurements. Position locating means of this type are known as such and do not require further explanation. The data, obtained by the various receivers is transferred to a processor for calculating the various locations and the location determining data is used for controlling display means on which a simulation of the real environment is made visible whereby the simulated dynamic objects do move in the simulated environment in the same manner as they move in the real environment.

Before each event a transponder has to be installed on each of the moving objects and at least three receivers (preferably more to increase accuracy) have to be installed in the direct vicinity of the area where the event will take place.

Another prior art system is described in WO9846029. In this system the position locating means are embodied as a video system comprising a number of television cameras installed at fixed points around the area on which the event will take place.

Each of the cameras provides information about each of the dynamic objects and because each of the cameras has a different view point and sees the various dynamic objects from a different viewing angle it is possible to calculate from this information the exact location of each of the dynamic objects at any moment in time. The more cameras, the more accurate the location can be determined, however, the more calculations have to be performed to obtain the desired results. Before each event the cameras have to be installed at fixed places, the exact location of each of these fixed places in relation to the real environment has to be determined very accurately.

In FR2726370 a system is described for providing data about the momentaneous location of each of the players in a game or competitors in a sporting event. The object of these systems is not to gather sufficient data to be able to obtain a simulation of the real environment. The actual object is to provide the arbiter or other officials following the game or the sporting event with sufficient data to be able to take, if necessary, the correct decisions. Two embodiments are described. In the one embodiment a transponder system is used as described in the first above mentioned publication whereas in the second embodiment a television system is used as described in the second abovementioned publication.

SUMMARY OF THE INVENTION

A disadvantage of said prior art system is, that before the event will take place either television cameras or radio receivers have to be installed around the area. The mutual location of these devices has to be adjusted or measured very accurately. After the event the cameras or receivers have to be removed. Especially in the television camera embodiment significant calculation power is necessary to obtain the desired location position data from the various images.

An object of the invention is now to provide an improved system in which the disadvantages of the prior art systems are eliminated.

The invention relates to a system for simulating events in a real environment containing static objects and dynamic objects, said system comprising: a) position locating means for continuously determining in the real environment the position of said dynamic objects in relation to said static objects within a time period in which the event takes place, b) storage means for storing data describing the dynamic and static objects of said environment, c) processing means for processing b1) data from said storage means describing the static and dynamic objects b2) data from the position locating means indicating at a certain moment the mutual positions of the static and dynamic objects of the environment, said processing means being loaded with simulation software, d) display means for displaying a simulated view from a selected viewpoint on the simulated environment as result of the processing by the processing means, e) control means to repeat the functioning of the means mentioned under c) and d) for a range of consecutive time moments which together determine the above-mentioned time period.

BRIEF DESCRIPTION OF THE DRAWINGS

The invention will be explained in more detail hereinafter with reference to the attached drawing.

FIG. 1 illustrates a first embodiment of a system according to the invention.

DETAILED DESCRIPTION OF THE PREFERRED EMBODIMENTS

In agreement with said object the invention now provides a system for simulating events in a real environment containing static objects and dynamic objects, comprising: a) position locating means for continuously determining in the real environment the position of said dynamic objects in relation to said static objects within a time period in which the event takes place, b) storage means for storing data describing the dynamic and static objects of said environment, c) processing means for processing b1) data from said storage means describing the static and dynamic objects b2) data from the position locating means indicating at a certain moment the mutual positions of the static and dynamic objects of the environment, said processing means being loaded with simulation software, d) display means for displaying a simulated view from a selected viewpoint on the simulated environment as result of the processing by the processing means, e) control means to repeat the functioning of the means mentioned under c) and d) for a range of consecutive time moments which together determine the above-mentioned time period. characterized in that said position locating means comprises a satellite navigation system, or a thereto-related system.

As such satellite navigation systems are known from the prior art. In wide spread use is the GPS (Global Positioning System). GPS receivers are generally available and are used e.g., for navigation on board of the ships, to assist surveying operations, etc. GPS is based on an older system named Navstar (navigation by satellite timing and ranging). The GPS system is operated by U.S. military authorities. A similar system, called Glonass, is owned and operated by Russian authorities.

For improved accuracy furthermore so-called differential GPS receivers (DGPS) are known. Thereby use is made of a local reference of which the location is accurately known. By applying a correction on the GPS data based on said reference the general accuracy can be improved significantly.

The use of GPS for locating competitors in a competition or players in a game is already known from the prior art. A first prior art system is described in NL9301186.

According to this Dutch publication each competitor in a competition or each player in a game carries a GPS receiver which is connected by suitable means to a transmitter. The positional data, calculated by said receiver based on the signals received from the various satellites, are transferred to the transmitter and transmitted to a central station. The central station receives in this way positional data about all competitors or players which data is used by the arbiters or other judging or controlling staff for taking correct decisions. In other words, the positional data is not used to control the generation of a simulated real environment in which the simulated players are behaving exactly in the same manner as the real players in the real environment.

Another prior art system is described in U.S. Pat. No. 5,731,788. Also in this case each of the competitors carries a GPS receiver connected to a transmitter to transmit the positional data of each competitor to a central station where said data can be used for following the event more closely. Also in this case nothing is said about using the positional data for simulating competitors in a simulated real environment.

In principal any display can be used to make the simulated environment visible to the user. However instead of a pc screen etc. more sophisticated display units as described e.g., in U.S. Pat. No. 5,674,127 can be used. This patent describes a multi user game and has nothing to do with a simulation of a real environment.

Although all the means necessary to provide the simulated environment can be positioned in the direct neighborhood of the real environment (for instance for control purposes) in general these means will be installed elsewhere.

A specific embodiment of the invention is therefore characterized in that the storage means, processing means, display means and control means are installed as a user terminal at a place remote from the real environment and that transfer means are used to transfer positional data from the position locating means to the storage means.

More in general the system will be embodied such that for each user of the system storage means, processing means, display means and control means are installed as user terminals at a place remote from the real environment and that transfer means are used to transfer positional data from the position locating means to all said storage means.

It is preferred that the transmission medium, along which the positional data are transferred from the real competition environment to the simulation system, is embodied by the internet. A large advantage thereof is that the positional data can be made available at a certain site and that a varying number of users, from a very small number to a very large number can log in to this site and are able to fetch the positional data into their system. Disadvantage of the use of the internet may be that a certain delay will appear between the moment onto which the positional data are recorded in the real competition and the moment at which the positional data are available in the system. A further disadvantage can be that in case of popular real competitions there are so many people who want to log in onto the site that overload may occur so that it is likely that part of the users cannot be provided with the necessary data.

If one wants to eliminate this disadvantage then it is preferred to make use of a telephone network as transfer medium (wire bounded or wireless). Also in that case a certain delay will take place over the telephone network but said delay can, especially if the competition environment is not too far from the system, considered as neglectible.

It is not necessary under all circumstances that the positional data will be used in the system such that the competition within the simulated environment is synchronous with the real competition (apart from the above indicated communication delay). It is also possible that all positional data together with the corresponding time data are stored on a suitable memory medium and that said memory medium is used as transfer medium. In this embodiment the user may activate his system at any voluntary moment and may "join" a competition, which has taken place in the past.

In the last described embodiment it is preferred that the memory medium is formed by a compact disc (shortly noted as CD) (or similar products, or products derived there from). Other memory media include hard disk drives, networked storage, and electronic storage, such as random access memory (RAM), flash memory cards, and the like.

To maintain the system up to date over a longer period it will be necessary to update the data about the competitors. In reality not always the same competitors will be present in succeeding competitions. To make adaptations possible it is preferred that the system comprises a competitor database in which data are stored about a number of possible competitors so that, after the competitors for a predetermined competition are known, the simulation of the real competitors within a simulated environment can be adapted.

Although a certain database can be filled with data about a large number of competitors such, that it is assured that during a certain period the competitors of the real game are in any case stored in the database, after a certain time it will be necessary to add new data. In that respect it is preferred that the data about competitors which are not in the database can be added through a suitable transfer medium from a suitable source to become stored in the competitors database.

Because competitions are not always held in the same environment or on the same track it is preferred that the system according to one of the preceding claims, comprises an environment database in which data about a number of possible competition environments are stored so that, after the specific environment where the competition will be held is known, the simulation of said environment can be adapted to the choice of the real environment.

In general the number of tracks for a specific sports or competition or the environments for a certain event are restricted. Adding or deleting environments is not very likely but not inconceivable. In that case it is preferred that data about an environment which is not contained in the environment database can be transferred from a suitable source to the system through suitable transfer means to become stored in said environment database.

To make the simulation of the environment as realistic as possible it is preferred that the simulation of the environment can be realized by means of images, which are taken on the real environment by suitable means.

The invention will be explained in more detail hereinafter with reference to the attached drawings.

FIG. 1 illustrates a first embodiment of a system according to the invention. The system comprises a computer 10 with a display screen 12, a keyboard 14 and a joystick 16. The computer 10 is loaded with software for simulating a competition environment on the screen 12 of the system. This competition environment comprises a predetermined track along which a number of competitors are able to move between a starting position and a final position. The track is displayed from the standpoint of the user of the system, which in fact is one of the competitors in the simulated competition environment. In the momentaneous state the screen of the display unit 12 shows part of an auto race track whereby at the left side in front of the user another competitor is visible. The user is able to influence its own speed and direction by means of the joystick 16 or by means of another input device, such as a steering wheel.

Systems of the type as described above are generally known as so-called computer games or computer animations whereby the user has the possibility to compete as it were in a race.

To significantly improve the illusion of "reality" in agreement with the invention a relation is established between the simulation on the screen 12 and a real game from a real circuit. In FIG. 1 a real circuit is indicated by 20 and on this circuit a race is in progress with amongst others the competitors 22, 24 and 26. Each of the competitors carries apparatuses by means of which continuously data about the momentaneous position of the competitor on the circuit can be transferred to a central post 28. The positional data can be collected for instance by means of a GPS receiver installed in each vehicle which receiver by means of a number of GPS satellites, one of which being indicated by 30 in the FIGURE, is able to determine accurately its own position. The data supplied by the GPS receiver determines therefore at any moment accurately the position of each competitor on the track 20. These positional data can now be transferred through a communication network 32 to the computer 10. The computer 10 in this application is loaded with software which has the ability to simulate the real track 20 on the screen 12 in an accurate manner and with very high reality content. The user of the system will get the impression that he is driving on the real track 20. Furthermore the software is embodied such that other competitors are simulated on the screen at those positions on the simulated track which correspond to the positions on the real track 20 where the competitors 22,24,26 etc. are present in reality. If the user on the simulated track 20 for instance will take a momentaneous position behind the real competitor 22, then on the real track 20 this can be indicated by means of the virtual competitor 34. The user of the system, which plays the role of said virtual competitor 34, will on his screen see the simulated real competitor 22, which in FIG. 1 is indicated by 22a.

Above it is assumed that GPS receivers are used for locating the positions. On the one hand not all GPS receivers will be suitable for this application. Normally GPS receivers determine the position with an accuracy of some tenths of meters. However, if a correction is applied then the accuracy increases less then a few centimeters. An example of a correction means is for instance the so-called DGPS system which is known as such. Within the scope of the invention preferably receivers with such a correction are applied. On the other hand however it is also possible to use other position determining means, for instance on the basis of laser measurements, transponders in the track road etc. As such, various kinds of means for position determining are known and further details are considered superfluous.

The data network 32 may comprise a telephone network whereby both wires bounded as well as wireless telephone networks and eventual combinations thereof are conceivable. The advantage of a telephone network is that there is almost synchronism between the real competition on the real circuit 20 and the simulated competition on the image screen 12. The disadvantage of using the telephone network is however that in general the costs for taking part in a complete competition of for instance two hours may increase significantly. Therefore it is preferred to use, instead of a telephone network, for instance the internet. The user should have an internet connection and should be able to log in through this connection onto a specific site where continuously and with the least possible delay position data of all competitors in the real competition are made available. These positional data are continuously loaded in the software running on the computer 10. Said computer 10 is thereafter able to perform the simulation on the screen 12 such that the simulated race on the screen 12 is almost synchronous with the real race on the real circuit 20. The advantage of this method is that, in case the site has enough connections available and has a sufficient accessibility, a large number of users may "take part" simultaneously, each with an own system to the real race on the circuit 20.

Instead of the internet also use can be made of television networks. The positional data are in that case transferred through the teletext system to the users. Eventually the screen of the television receiver can be used for visualizing the simulation instead of the computer display.

Until so far it is assumed that the simulated competition concerns an auto race. However, the invention is not restricted thereto. Instead of an auto race it could concern a motor race, a bicycle competition, a running competition, a horserace, races with powerboats or sailing vessels, military exercises etc. Furthermore it is not necessary that the competition be performed at closed circuit such as the circuit 20 in the FIGURE, whereby the race is performed over a certain number of rounds. Instead thereof the track may consist of a single track between certain starting point and a certain final point. In this way it is for instance possible to simulate tracks of bicycle competitions such as the Tour de France, etc. on the screen of the system. However, it will be clear that heavier requirements will be put to the memory capacitor of the computer because the track data of a much longer track have to be stored in the computer.

Because competitions do not always take place on the same track it is preferred that the computer 10 has memory means for storing a number of competition environments. Therewith the user of the system is able, notwithstanding the place where the race is being held, to take part in the race because the correct environment can be called up from the memory.

In a similar manner it is preferred that the system 10 comprises a memory in which the data about a large number of real competitors are stored dependent on the competitors which at a certain moment are taking part in a real competition, the respective data of the competitors can be called up from a memory and therewith the real participating competitors can be simulated on the screen.

In order to manage interactions between the real-world dynamic objects and the simulated object, the software running on the computer 10 includes an artificial intelligence (AI) engine. In some embodiments, the AI engine includes collision detection to manage (i.e., prevent) collisions of the virtual competitor 34 with a simulation of the real competitor 22. This can be accomplished an interaction boundary around the virtual competitor 34, the real competitor 22, or each of the virtual competitor 34 and the real competitor 22. The interaction boundary can be defined by polygon tunnels projected from the virtual competitor 34, that may vary in extent, shape, or both extent and shape according to speed and bearing.

When an virtual competitor 34 takes a momentaneous position too close to one of the simulated real competitors 22, one of the polygon tunnels intersects with the simulated real competitor 22, identifying a potential collision. Upon this occurrence, the AI engine temporarily takes over control of the simulated real competitor 22, operating it in an autonomous mode. The AI engine can initiate an overtake sequence determining whether it is wise to overtake the virtual competitor 34 at the particular point on the track 20, and whether it can be accomplished at a sensible speed given the position on the track. If the AI engine decides to have the simulated real competitor 22 autonomously overtake the virtual competitor 34, the AI engine performs such an overtake sequence, overtaking the virtual competitor 34. The overtake sequence can be implemented by recalculating on a frame-by-frame sequence. When the autonomous, simulated real competitor 22 completes the overtake procedure, the simulated real competitor 22 is repositioned to the actual position of the real competitor 22 on the track 20 at that time over a series of frames to provide a smooth and realistic transition. Once the autonomous, simulated real competitor 22 reaches the position of the real competitor 22 on the track 20, the simulated real competitor 22 is once again managed by position data (e.g., GPS data) obtained from the real competitor 22.

Alternatively or in addition to such an overtake sequence, the AI engine can implement other scenarios, in which the simulated real competitor 22 is at least temporarily controlled by the AI engine. In some embodiments, such autonomous control of the simulated real competitor 22 occurs in response to the virtual competitor 34. Preferably, such AI engine controlled interaction between the virtual competitor 34 and the simulated real competitor 22 is implemented to provide the virtual competitor 34 with a realistic interaction between itself and one or more of the real competitors 22 within the simulation.

In the exemplary embodiment, the virtual competitor 34 continues to respond to user input, even though the user input would otherwise result in an unrealistic interaction between the virtual competitor 34 and the simulated real competitor 22 (e.g., a crash), without sacrificing user control of the virtual competitor 34. Rather, the AI engine manages such potential interactions by assuming control of the simulated real competitor 22, such that position of simulated real competitor 22 within the display at least temporarily varies from the actual position of the real competitor 22. After a reasonable period of time and when conditions permit, the AI engine returns the simulated real competitor 22 to a position corresponding to the actual position of the real competitor 22 on the track 20. Although the exemplary operation of the AI engine is described within the context of interaction of race cars, the AI engine is capable of similarly managing interaction between virtual competitor and simulations of real competitors.

In some embodiments, the AI engine includes additional functionality. For example, in situations in which there may be a substantial data outage (e.g., where the lost data is more than the latency time so data interpolation is not possible), each affected simulated real competitor 22 is temporarily controlled in an autonomous mode by the AI engine. The AI engine translates the simulated real competitor 22 from the last known reported position to a control path. In some embodiments, the control path is a best path possible, previously determined for the given track 20. Autonomous control proceeds throughout the data outage in a frame-by-frame process, continuing with the last known velocity, bearing, and acceleration. Meanwhile, the simulation software continues to attempt receiving valid data. After resuming receipt of valid data, the AI engine transitions the autonomously controlled simulated real competitor 22, to the actual position of the real competitor 22 on the track 20. Once again, this transition from the control path to the actual position of the real competitor 22 can be accomplished by the AI engine in a smooth and realistic way using a frame-by-frame process.

In the above-described embodiments it is assumed that the simulated game and the real game are performed almost synchronously. However, it is not always necessary. In a preferred embodiment all position data which are gathered during the competition together with the corresponding time measurements are stored in a suitable memory means during the competition. Said memory means may function as transfer medium and can be, after all data are stored, transferred to the system and can be used by the user at any voluntary moment to take part in the race at a much later time. As memory means preferably use is made of a compact disc because more and more personal computers comprise a CD player. Because said compact disc forms a significant product within the system separate rights are claimed for said compact disc through the attached claims.

Another important component of the system in an embodiment where the internet is used as communication means is the internet site, where the users have to log in to obtain the positional data. Also for this site, through which the positional data are made available, and which site is characterized thereby, separate rights are claimed through the attached claims.

What is claimed is:

1. A system for events in a real environment containing static objects and dynamic objects, comprising;
   a) position locating means for continuously determining, in the real environment, the position of said dynamic objects in relation to said static objects within a time period in which the event takes place,
   b) storage means for storing data describing the dynamic and static objects of said environment,
   c) processing means operatively connected to said position locating means and said storage means, said processing means for processing
      b1) data from said storage means describing the static and dynamic objects,
      b2) data from the position locating means indicating at a certain moment the mutual position of the static and dynamic objects of the environment, said processing means being loaded with simulation software, d) display means operatively connected to said processing means, said display means for displaying a simulated view from a selected viewpoint on the simulated environment as result of the processing by the processing means, e) an artificial intelligence engine adapted to selectively manage interaction with one or more of said dynamic objects by:

detecting an interaction with a dynamic object; and during a temporary period, assuming autonomous control of a simulated object corresponding to a real dynamic object, wherein, during the temporary period, the position of the simulated object in a simulated environment is varied from the corresponding position in the real environment;

f) control means operatively connected to said processing means and to said display means, said control means to repeat the functioning of processing means and the display means for a range of consecutive time moments which together determine the above-mentioned time period, wherein, said position locating means comprises a satellite navigation system, and the system comprises an environment database in which data about a number of possible competition environments are stored so that, after a specific environment where the competition will be held is known, the stimulation of said environment can be adapted to the choice of the real environment.

2. A system according to claim 1, characterized in that the storage means, processing means, and display means and control means are installed as a user terminal at a place remote from the real environment and that transfer means are used to transfer positional data from the position locating means to the storage means.

3. A system according to claim 1, characterized in that for each user of the system storage means, processing means, display means and control means are installed as user terminals at a place remote from the real environment and that transfer means are used to transfer positional data from the position locating means to all said storage means.

4. A system according to claim 2, characterized in that the internet is used as transfer means.

5. A system according to claim 2, characterized in that a telephone network is used as transfer means.

6. A system according to claim 1, characterized in that during the whole time period of a competition all positional data together with corresponding time data are stored in a memory, which memory can be used after the competition as transfer medium.

7. A system according to claim 6, characterized in that the memory is formed by a compact disc.

8. A system according to claim 1, characterized in that the system comprises a competitors database in which data about a number a possible competitors are stored so that, after the competitors for a particular event or competition are know, a simulation of real competitors within the simulated environment can be adapted.

9. A system according to claim 8, characterized in that data about competitors which are not present in the competitor database can be transferred through a transfer medium from a suitable source to the system to become stored in said competitor database.

10. A system according to claim 8, characterized in that the competitors database is integrated into a user terminal.

11. A system according to claim 1, characterized in that data about an environment which is not contained in the environment database can be transferred from a suitable source to the system through suitable transfer means to become stored in said environment database.

12. A system according to claim 1, characterized in that the environment database is integrated into the user terminal.

13. A system according to claim 1, characterized in that the simulation of the real environment can be realized by means of images which are taken from the real environment.

14. A system according to claim 7 characterized in that at least some events, which will happen during the real competition, are stored as separate image data in said compact disk, such that these images can be displayed at suitable time moments during the simulated competition.

15. A system according to claim 1, characterized in that the display means for displaying the simulation of at least part of the environment with the dynamic objects therein is formed by a virtual reality helmet.

16. A system according to claim 1, wherein the simulated view from a selected viewpoint on the simulated environment corresponds to a view from a virtual competitor competing with said dynamic objects.

17. A system according to claim 16, wherein said artificial intelligence engine manages interaction between said virtual competitor and one or more of said dynamic objects.

18. A system according to claim 17, wherein said artificial intelligence engine controls a respective position of one or more of said dynamic objects in response to said virtual competitor.

19. A system according to claim 18, wherein said artificial intelligence engine autonomously controls at least one of said dynamic objects in response to a distance between said virtual competitor and said at least one of said dynamic objects being less than a threshold distance.

20. The system of claim 1, wherein the artificial intelligence engine is further adapted to selectively manage interaction with one or more of said dynamic objects by:

after the temporary period, adjusting the position of the simulated object in the simulated environment to correspond to the position of the real object in the real environment.

21. A compact disc for application in a system according to claim 1, characterized in that the compact disc comprises: positional data and corresponding time data of at least a number of competitors to the real competition during at least part of a real competition.

* * * * *

UNITED STATES PATENT AND TRADEMARK OFFICE
CERTIFICATE OF CORRECTION

PATENT NO. : 8,160,994 B2  Page 1 of 1
APPLICATION NO. : 12/106263
DATED : April 17, 2012
INVENTOR(S) : Ong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 827 days.

Signed and Sealed this
Fourteenth Day of August, 2012

David J. Kappos
*Director of the United States Patent and Trademark Office*